US008452775B2

(12) United States Patent
Capuozzo et al.

(10) Patent No.: US 8,452,775 B2
(45) Date of Patent: May 28, 2013

(54) ACCESSING CONTENT ITEMS IN A NETWORK BASED ON DEVICE CAPABILITY INFORMATION

(75) Inventors: Giuseppe Capuozzo, Rome (IT); Marco Borghini, Rome (IT); Giovanni Persia, Rome (IT)

(73) Assignee: Accenture Global Services Limited, Dublin (IE)

( * ) Notice: Subject to any disclaimer, the term of this patent is extended or adjusted under 35 U.S.C. 154(b) by 114 days.

(21) Appl. No.: 12/857,921

(22) Filed: Aug. 17, 2010

(65) Prior Publication Data

US 2011/0055218 A1    Mar. 3, 2011

(30) Foreign Application Priority Data

Aug. 28, 2009  (EP) .................................... 09425337

(51) Int. Cl.
*G06F 17/30* (2006.01)
(52) U.S. Cl.
USPC .......................................... 707/741; 707/802
(58) Field of Classification Search
USPC ................................. 707/741, 802
See application file for complete search history.

(56) References Cited

U.S. PATENT DOCUMENTS

| | | | | |
|---|---|---|---|---|
| 7,720,889 | B1 * | 5/2010 | Goodson et al. | 707/809 |
| 2006/0136401 | A1 * | 6/2006 | Normington | 707/3 |
| 2006/0161635 | A1 * | 7/2006 | Lamkin et al. | 709/217 |
| 2006/0294123 | A1 * | 12/2006 | Altman | 707/100 |
| 2008/0109478 | A1 * | 5/2008 | Wada et al. | 707/103 Y |
| 2008/0270461 | A1 * | 10/2008 | Gordon et al. | 707/103 R |

OTHER PUBLICATIONS

Matsubara et al., Managing a Media Server Content Directory in Absence of Reliable Metadata, IEEE, pp. 873-877, Apr. 14, 2009.
European Search Report from corresponding European Patent Application No. 09425337.4, 10 pgs., dated Feb. 9, 2010.
Office Action issued in related Chinese Application No. CN201010265417.2 dated Jun. 29, 2012 (7 pages); and English translation (6 pages).

* cited by examiner

*Primary Examiner* — Son T Hoang
(74) *Attorney, Agent, or Firm* — Brinks Hofer Gilson & Lione

(57) ABSTRACT

A computer-implemented method, a computer program product and a computer system assist a user to access a content item in a network such as a home network, the method comprises gathering capability information from a device, such as a digital music player in the network, wherein the device includes a directory of content items, wherein the directory includes a first container and a second container, wherein at least one of the plurality of content items is organized in the first container, and wherein at least one of the plurality of content items is organized in the second container; providing an index referring to the content items, the first container, and the second container; determining whether the directory has been modified; performing a content item search if the directory has been modified; and updating the index based on the results of the content item search.

18 Claims, 8 Drawing Sheets

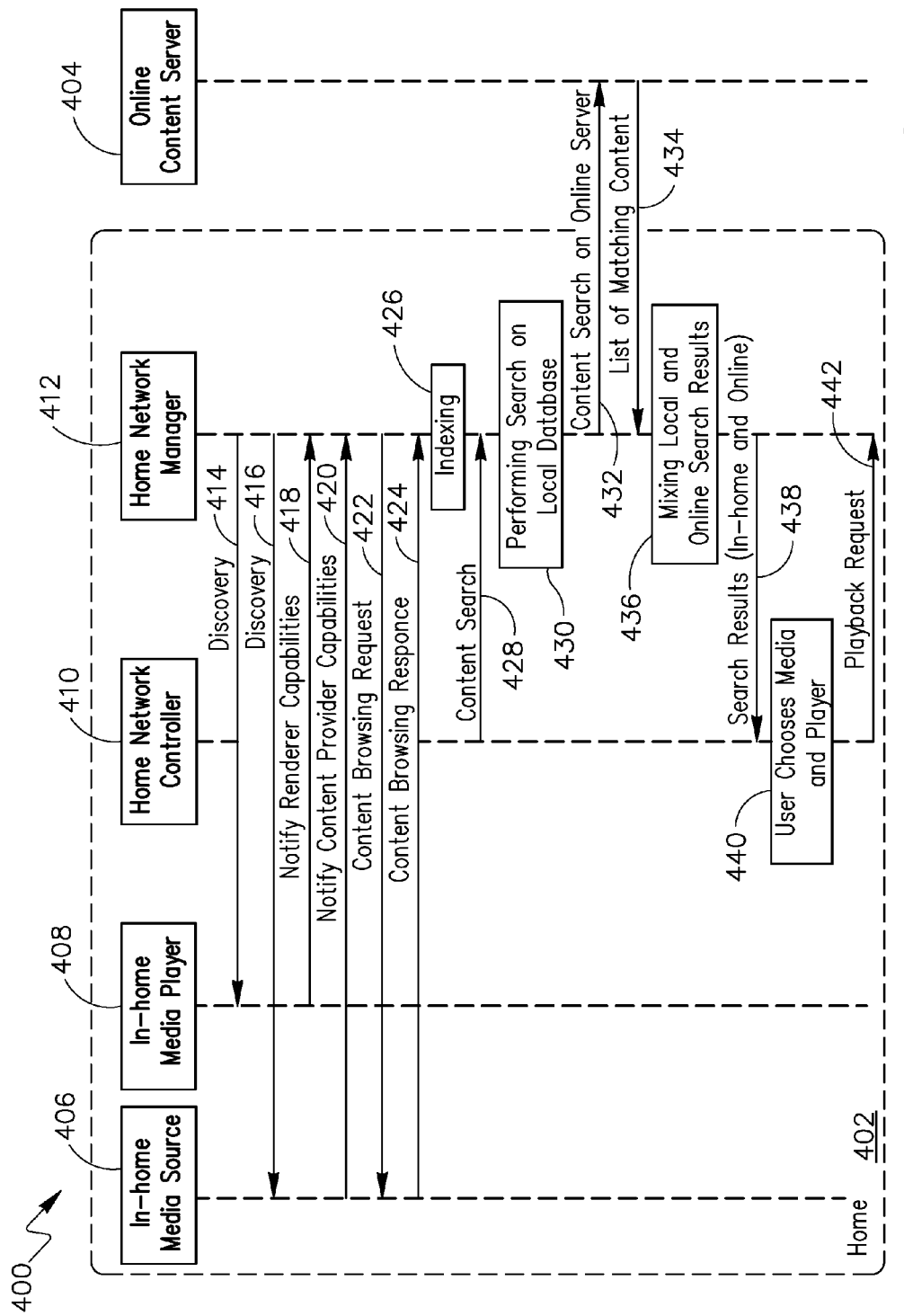

ACCESSING CONTENT ITEMS IN A NETWORK BASED ON DEVICE CAPABILITY INFORMATION

PRIORITY CLAIM

This application claims the priority benefit of European Patent Office application serial number 09 425 337.4 filed Aug. 28, 2009, titled Accessing Content in a Network.

BACKGROUND OF THE INVENTION

1. Technical Field

This application relates to a computer-implemented method for facilitating user access to a content item in a network, such as a home network.

2. Related Art

Digital content, regardless of its nature, is expressed in streams of bits which can be stored everywhere, carried everywhere, and enjoyed everywhere. However, the digitization often causes content spreading, forcing users to needlessly micromanage where their content is stored, and to wonder in frustration how to easily access or share this content, avoid misuse, and maintain data integrity. A home network manager device or digital media controller may provide information to a home network community server. This information may include the listing of capabilities and contents stored on the content rendering and storing devices managed by the home network manager, as well as the users who are authorized to retrieve or store the content.

It may be a problem to efficiently build and maintain an index that facilitates quick access by a user to content items in a home network.

SUMMARY

According to an aspect, a computer implemented method for facilitating user access to a content item in a network, such as a home network, is provided. The method may comprise:
  gathering capability information from a device, such as a digital music player, in the network, wherein the device includes a directory of a plurality of content items, wherein the directory includes a first container and a second container, wherein at least one of the plurality of content items is organized in the first container, and wherein at least one of the plurality of content items is organized in the second container;
  providing an index referring to the plurality of content items, the first container, and the second container;
  determining whether the directory has been modified;
  performing a content item search if the directory has been modified; and
  updating the index based on the results of the content item search.

It may be understood that the step of updating the index is only performed if a content item search has been performed. The content item search may comprise browsing the containers identified in a container modification event message.

Although a first container and a second container are referred to, it may be that there are an arbitrary number of containers. The containers may be arbitrarily nested and content items may be arbitrarily organized among them.

The method may comprise sending a subscription message to the device in order to activate an event subscription, if the capability information indicates that the device is capable of sending a container modification event message. It may be understood that the container modification event message identifies a container that has been modified.

In addition, the method may comprise sending a subscription message to the device in order to activate an event subscription, if the capability information indicates that the device is capable of sending an event message. The method may further comprise deactivating the event subscription, if the capability information indicates that the device is not capable of sending a container modification event message.

Furthermore, it may be that when the capability information indicates that the device is capable of sending a container modification event message, determining whether the directory has been modified comprises receiving the container modification event message. In this case, the container modification event message indicates that the second container has been modified and that the first container has not been modified. The content item search may be restricted to the second container.

Moreover, when the capability information indicates that the device is not capable of sending a container modification event message, determining whether the directory has been modified may comprise polling the device. Polling the device may be understood as sending a message to the device in order to check a state variable.

Accordingly, it may be that when the capability information indicates that the device is capable of responding to a search based on search criteria, and when determining whether the directory has been modified indicates that the directory has been modified, performing the content item search comprises using search criteria, wherein the search criteria is based on a index of content items. In this case, the search criteria may be designed so that the search excludes content items on the device that have already been indexed.

Providing the index may further comprise determining that the device supports a directory service, wherein the index does not refer to content items on devices that do not support the directory service. It may be understood that the index does not refer to devices that do not support the directory service.

Also, each referenced container in the index may have a corresponding version number.

Moreover, it may be that the index refers to the device and the capability information of the device.

Furthermore, it is possible that at least one indexed container has an associated tag in the index and/or wherein at least one indexed content item has an associated tag in the index.

Providing the index may comprise sending search message to a multicast address, and when a responding device provides an indication that the responding device supports the directory service, the method may further comprise adding references to content items on the responding device to the index. The method may further comprise adding references to the device and capability information of the device to the index.

It may be that the method further comprises adding a third container to the device, wherein the third container organizes multiple content items. The method may further comprise associating a first tag with the first container, a second tag with the second container, and a third tag with the third container, wherein each tag defines the content items organized by the associated container. In addition, the method may comprise performing a comparison of the third tag with the first tag and a further comparison of the third tag with the second tag. The method may also comprise updating the index to include the third container and the multiple content items organized by the third container, if the third tag does not define the same content items as the second tag and the third tag does not define the same content items as the first tag.

According to another aspect a computer program product comprising computer readable instructions is provided. The instructions, when loaded and executed on a computer system, cause the computer system to perform operations according to any one of the method steps described above.

According to yet another aspect, a computer system for providing user access to a content item in a network, such as a home network, is provided. The system may comprise a content storing device, such as a digital music player. The content storing device may store a directory of a plurality content items, wherein the directory includes a first container and a second container, wherein at least one of the plurality of content items is organized in the first container, and wherein at least one of the plurality of content items is organized in the second container. The computer system may also include a network manager device. The network manager device being operable to gather capability information from the content storing device and provide an index referring to the plurality of content items, the first container, and the second container. The network manager device being further operable to determine whether the directory has been modified, perform a content item search if the directory has been modified, and update the index based on the results of the content item search. In addition, the network may connect the network manager device to the content storing device.

Although a first container and a second container are referred to, it may be that the content storing device includes an arbitrary number of containers. The containers may be arbitrarily nested and content items may be arbitrarily organized among them.

The subject matter described in the specification can be implemented as a method or as a system, possibly in the form of one or more computer program products. The subject matter described in the specification can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

BRIEF DESCRIPTION OF THE DRAWINGS

The innovations may be better understood with reference to the following drawings and description. In the figures, like reference numerals designate corresponding parts throughout the different views.

FIG. 4 is a swim-lane diagram showing an example sequence of actions for in-home access and playback control.

DETAILED DESCRIPTION

Figure 1:
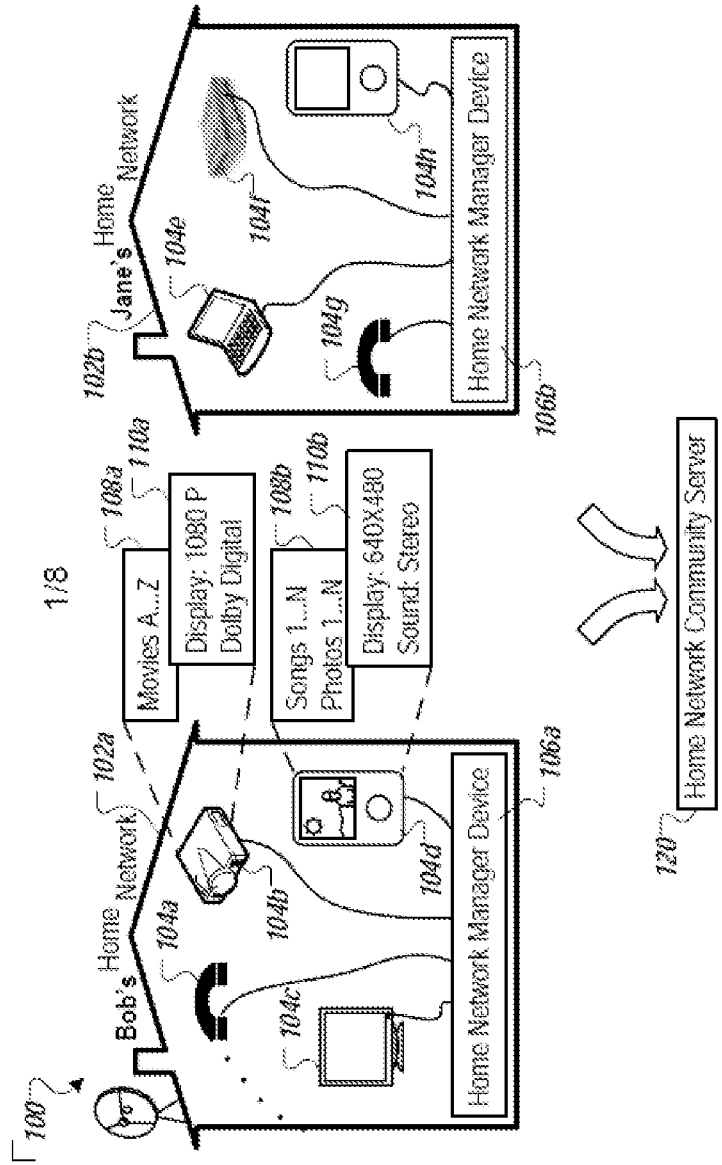
FIG. 1 illustrates an exemplary media sharing system, allowing media sharing between multiple home networks.

In the following text, a detailed description of examples will be given with reference to the drawings. It should be understood that various modifications to the examples may be made. In particular, elements of one example may be combined and used in other examples to form new examples.

The following paragraphs, up until the figures, may provide context to aid in understanding the figures.

An enhanced content sharing framework may provide a straightforward approach for users to access multimedia content (e.g. text, music, pictures, videos, etc.), regardless of the physical or logical location of a content. For example, the framework may be implemented as a system which is part of a residential local area network (LAN) that is capable at connecting to a community of one or more consumer electronic devices. Electronic devices may include digital music players, personal computers (PCs), telephones, network attached storage (NAS), digital picture frames (DPFs), cameras, set-top boxes (XTBs), digital versatile discs (DVDs), internet protocol televisions (IPTVs), or other devices. The enhanced framework may include one or more home network manager devices.

The home network manager device may actively or passively discover (i.e. determine the existence of) content servers and players in the home network, index the content items exposed by the servers regardless of a location of the content, and gather capabilities of players. Content items may be digital media files, such as digital music files (e.g. mp3 format files) or digital movie files (e.g. avi format files). Discovery may be performed by sending a search message with a pattern or target equal to a type or identifier for a device or service. The search message may be sent to a reserved multicast address and port number (e.g. 239.255.255.250:1900). Discovery may also be referred to as searching for devices. Discovery may be implemented using the Simple Service Discovery Protocol (SSDP).

The index of content items may be used to find multimedia contents in a simplified manner, regardless of the physical location or logical address of the content items. Once the content item is accessed, an authorized user may play or render the multimedia content on any appropriate or capable player, such as a big screen television in the living room (e.g. connected to an IPTV STB), a hi-fi stereo in the bedroom, a portable player by the hot tub outside, a digital book, or a remote device which is an iPod (iPod is a trademark of Apple Corporation). Furthermore, the system may seamlessly provide access to on-demand content stored on online servers.

Allowing user access to online content may provide content vendors or service providers with an opportunity to sell additional targeted content. For instance, if the user is looking for songs by the rock group U2, the system may provide the user with links to or information about U2 songs found locally (e.g. in the user's home network) and may further identify free or paid online content associated with this group. When linked to online service in this way, the enhanced framework may dynamically use profile information defining user preferences and tastes, thus facilitating targeted advertising. The enhanced framework may also allow the user to access the media remotely, or to seamlessly transmit content to and from other communities. For example, a user "Jane" may use the system to define a "home network community" in which Jane may choose what content from which devices to share, and with whom. Selecting content to share may be performed, for example, by defining access privileges, rights and rules (e.g. best friend Alice may view all of Jane's library, but Bob may access only Jane's vacation pictures stored on her PC). Users may access resources available in a "buddy list", whose list items are managed by content servers in trusted home networks. For example, once Jane has established her home network community, Alice is free to view Jane's entire library, and Bob may look at the vacation pictures stored on Jane's PC.

A system to control and manage home network content may be configured and hosted in many forms, such as using PC software, mobile phone software (e.g. iPhone, Symbian, Windows Mobile, etc.), stand alone or ad hoc hardware devices, or combinations thereof (iPhone is a trademark of Apple Corporation, Symbian is a trademark of the Symbian Foundation, Windows is a trademark of Microsoft Corporation). In some implementations, mobile phones may be a solution, since the mobile phone enables access to all the features anywhere, for example, while in the home, at work, or while traveling.

From the user's perspective, the ability to access media remotely may eliminate physical barriers between the user and their content, and make this content immediately available. The framework may also eliminate the need for the user to learn multiple interfaces and commands associated with individual devices. Furthermore, the user may enjoy new content, discovered or tailored according to the user's stated or inferred preferences.

From a service provider or content vendor point of view, the enhanced framework may be another way to provide access to an online catalogue, or to reinforce the trust relationship with the customer via an implanted user interface. In some implementations, the enhanced framework may also facilitate a strong subscriber acquisition and retention strategy. If the service provider is also a mobile and fixed network operator (e.g. cell phones and land lines), the enhanced framework may be used as a driver for fixed-mobile convergence. For example, service providers may implement a policy that only those users who subscribe to both fixed and mobile services may enjoy remote access. In this way, mobile data traffic may increase, which may result in additional revenues for service providers.

In some implementations, the enhanced framework may facilitate the service provider to collect new information about habits and tastes, facilitating the creation of custom profiles and the offering of custom advertising. For example, such information may be collected during each use of the system by the user. In some implementations, the system may be offered free of charge to any user agreeing to surrender personal profile data, such data may then be used and aggregated without leading to privacy or security issues for the user.

FIG. 1 illustrates an exemplary media sharing system 100, allowing media sharing between multiple home networks 102a and 102b. In this example, the home network 102a includes a group of electronic devices 104a to 104d, each capable of rendering and/or storing media content. Devices 104a to 104d may be referred to as content storing devices or content rendering devices. For example, a standard iPod is capable of rendering (playing, displaying, or otherwise outputting) music, thus making it a rendering device. The iPod is also a media storage device because it is capable of storing music (e.g. in mp3 or other format). As depicted, device 104a is a telephone, device 104b is a digital movie player, device 104c is a flat screen television, and device 104d is an iPod. As such, while Bob is at his home, he is capable of enjoying content on any of the devices 104a or 104d, such as by sitting in a family room watching a football game on a flat screen television device 104c, or listening to his iPod 104d on the patio.

Home networks may be aggregated by means of a home network community server 120. Each individual home network (e.g. home networks 102a, 102b, etc.) can be managed by a single home network manager device (e.g. home network manager devices 106a and 106b). Each home network manager device 106a and 106b may be understood as a controller or a control point. The home network manager device may also be referred to as a network manager device. Managed devices 104a-d (or 104e-h) may function in the role of servers, responding to requests from their corresponding home network manager device 106a or 106b. The home network manager devices 106a and 106b may be implemented on a variety of platforms including personal computers and embedded systems. Communication between home networks may be possible by using the home network community server 120 as an intermediary. In some implementations, the first and second home network manager devices 106a and 106b may make up the single home network manager device. Communications between the home network manager device 106a and the managed devices 104a-d may be carried out using the TCP/IP protocol. Further, the first and second home networks may be implemented as a single home network.

The home network manager device 106a may transmit one or more discovery requests to one or more content rendering devices and content storing devices. The discovery request may be implemented by sending a search message encapsulated in a user data protocol (UDP) packet to a multicast address. Based on a discovery request, data identifying content items, as well as data identifying and listing capabilities of the one or more content rendering devices and content storage devices may be transmitted in a response to the home network manager device 106a. Alternatively, the home network manager device 106a may wait for the content rendering and content storing devices to broadcast their capabilities and identities.

Jane's home network 102b includes a laptop device 104e, a DVD player device 104f, a telephone device 104g, and an iPod device 104h. Each of Bob's and Jane's home networks 102a and 102b may include a number of electronic devices in addition to the devices 104a to 104h shown in FIG. 1.

Bob's home network 102a includes a home network manager device 106a capable of managing devices 104a to 104b. Management occurs using device information, such as communication protocol information, that home network manager device 106a uses to communicate with each of the devices 104a to 104b. Moreover, the home network manager device 106a may collect, maintain and provide access to the information for each device, such as the media contents and the specifications and/or capabilities of the devices in the home network. For example, the movie player device 104b may store movies A to Z 108a, and may have the specifications 110a, such as being able to display 1080 pixels and having Dolby digital sound. In another example, the iPod device 104d stores content 108b (e.g. "Songs 1 . . . n" and "Photos 1 . . . n") and has specifications 110b (e.g. "Display 640×480" and "Sound: Stereo").

A home network community server 120 may manage the information from groups of users' home networks (e.g. networks 102a and 102b). In some implementations, the home network community server 120 may be deployed by a user service provider, such as the company that provides the user's wireless phone service.

Figure 2:
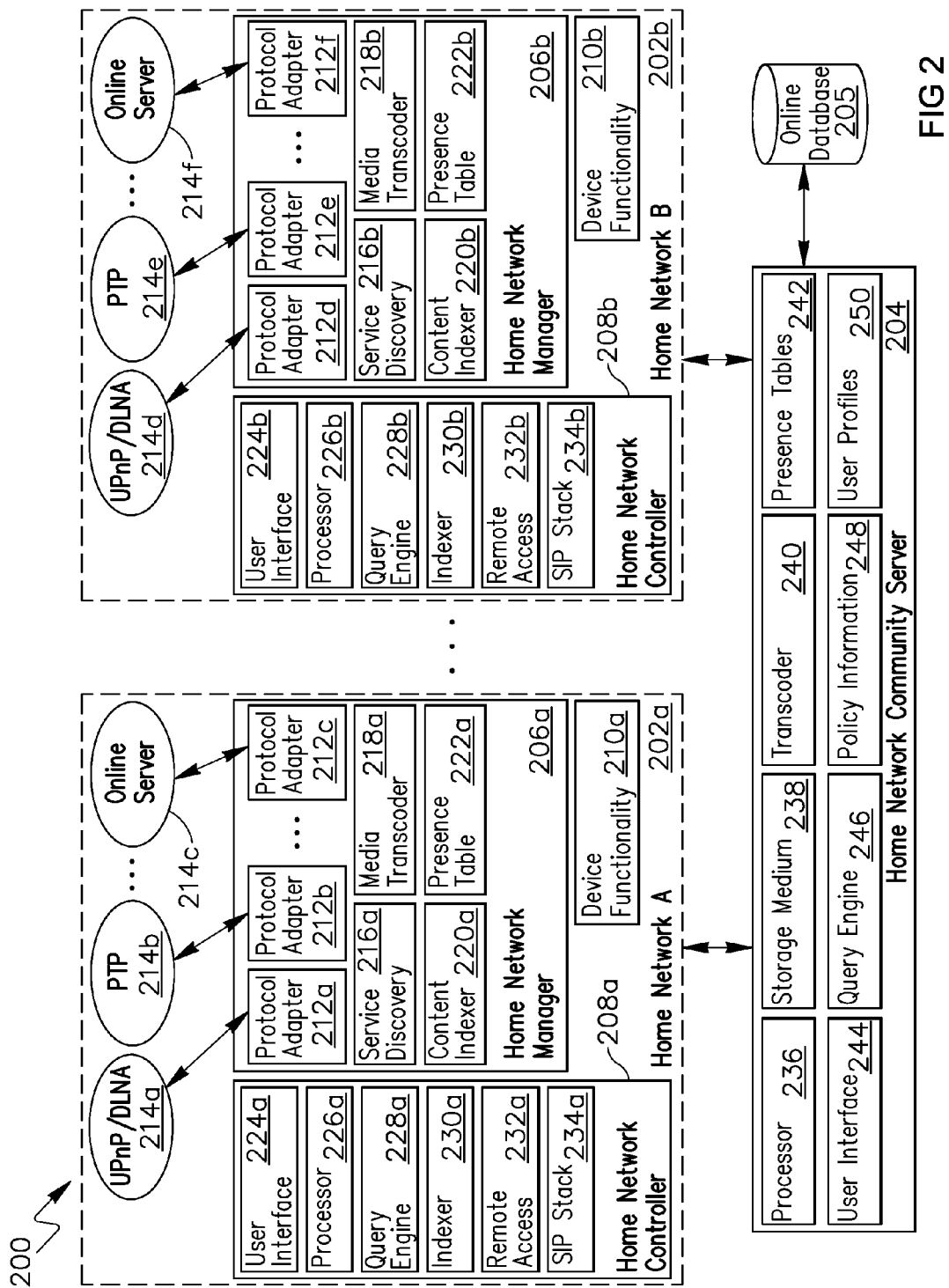
FIG. 2 is a block diagram of an example communications architecture between two home networks using a home network community server.

FIG. 2 is a block diagram of an example communications architecture 200 between home networks A 202a and B 202b using a home network community server 204. The home network community server 204 may be understood as a specific example of the home network community server 120. And networks 202a and 202b, for example, may represent Bob's home network 102a and Jane's home network 102b respectively, as described with respect to FIG. 1.

Home network A 202a and home network B 202b each interact with the home network community server 204. The server 204 interacts with one or more online databases 205, which may be used to identify and provide online media content that is considered pertinent to users of system 100.

The home network A 202a includes a home network manager 206a, a home network controller 208a, and a device functionality module 210a. The home network manager 206a may correspond to the home network manager device 106a. More specifically, the home network manager 206a defines software components that may be executed or stored on the home network manager device 106a. For example, the home network manager 206a may include software that executes on the device 106a, where the device 106a may be a separate network box that is provided to Bob to manage his home network. As such, the home network manager 206a may include software that executes in that box, e.g. the device 106a. The home network manager 206a includes protocol adapters 212a to 212c, each used as a protocol for interfacing with the enabled consumer electronic devices and media services 214a to 214c. For example, devices/sources 214a and 214b may correspond to various electronic components in Bob's home network 102a, each rendering and/or storing media content. In other words, devices 214a and 214b may correspond to a content rendering device and/or content storing device in Bob's home network 102a. More specifically, UPnP/DLNA device 214a may be a device that complies with the Digital Living Network Alliance (DLNA) Networked Device Interoperability Guidelines as well as the Universal Plug and Play Device Architecture requirements for device discovery and control (UPnP and DLNA are registered trademarks). PTP device 214b can be accessed using the Picture Transfer Protocol, possibly with Internet Protocol (IP) extensions. The devices 104a-104h may be understood to correspond to device 214a and/or device 214b depending on the protocol used to access the particular device. For example, assuming that protocol adapter 212a is used to communicate with devices 104a-104d, the devices 104a-104d correspond to UPnP/DLNA device 214a. The online server 214c may be used to access on-demand content.

The home network controller 208a can be used to interact with the home network A 202a and provide information regarding the home network A 202a. In addition, the home network controller 208a can be implemented as software and/or as a device. For example, the user can interact with the system 100 by means of the home network controller 208a (e.g. installed on Bob's iPod Touch). The user may use a user interface 224a to select media of interest and perform a desired action (e.g., send a photo to a friend, or watch a favorite movie). A processor 226a may be operable to carry out instructions based on input received by means of the user interface 224a. A query engine 228a may facilitate the user to query content items indexed by the home network manager 206a. An indexer 230a may interface with the home network manager 206a and may facilitate queries of content items. A remote access component 232a can facilitate access of content items in the home network A 202a from a remote location (e.g. by means of a mobile device). A SIP stack 234a can be used to facilitate sending Session Initiation Protocol (SIP) messages between components of the home network A 202a.

The device functionality module to 210a can provide device functionality information (e.g. capabilities to play and/or store certain types of media) for all devices within the home network 202a. For example, if a movie is selected by the user to play within home network 202a, the device functionality module 210a can be used to identify devices that are functionally capable of playing or rendering the movie, and/or are functionally capable of storing the movie.

The home network A 202a further includes a service discovery module 216a, a media transcoder 218a, a content indexer 220a, and a presence table 222a. The service discovery module 216a may determine, within home network A 202a, the devices and types of service available, such as content storing devices and/or rendering capable devices. The media transcoder 218a performs digital conversions from one digital format to another for devices 104a-104d in Bob's home network. In other words, the transcoding may convert media content to match the listed capability of a particular content rendering device or content storing device on which the media content is to be played or stored.

For example, the media transcoder 218a may produce a bit stream for a digital photo (e.g. in a JPG format) that allows the digital photo to be rendered on a different device, particularly one that is capable of processing bit streams. The device storing the digital photo and the device on which the digital photo is rendered may both be located in Bob's home network 102a. The content indexer 220a performs indexing on each of the devices in home network A 202a. The content indexer 220a may access the devices 104a to 104d in Bob's home network, creating an index to the content (e.g. songs, photos, movies, etc.) on each device. The output produced by the content indexer 220a may be stored in the presence table 222a.

The home network B 202b may include similar components, specifically a home network manager 206b, a home network controller 208b, and a device functionality module 210b. The home network manager 206b includes protocol adapters 212d to 212f, each used for interfacing with enabled consumer electronic devices and media sources 214d to 214f. The devices/sources 214d to 214f correspond to devices 104e to 104h. The home network manager 206b further includes components 216b to 222b, which may be the same as or different from similar components in the home network manager 206a. For example, different versions of software comprised by home network managers may exist, or different components may be optional, based for example, on a level of service that is purchased from an Internet service provider or wireless phone provider. Similarly, the home network controller 208b may include components to 224b to 234b. The home network controller 208b and components 224b-234b may perform functions similar to those of home network controller 208a and components 224a-234a.

The device functionality module 210b can provide functionality information (e.g. capabilities to play and/or store certain types of media) for all devices within the home network B 202b. For example, the device functionality module 210b can be used to identify devices that are functionally capable of playing (or rendering) the movie, and which devices may be able to store the movie.

The home network community server 204 includes a processor 236, a storage medium 238, a transcoder 240, presence tables 242, a user interface 244, a query engine 246, policy information 248, and user profiles 250. The processor 236 may receive communications from, and then respond to, all networks within the community, such as home networks A 202a, B 202b, and/or others not shown in FIG. 2. The storage medium 238 may physically store media content, such as photos, movies, music, recordings, or other content items. The media content on the storage medium 238 may include a subset of the media content on home networks A 202a and B 202b, e.g. a cache of recently used content items. The transcoder 240 may perform digital to digital conversions from one digital format to another. For example, if a user of home network A 202a accesses a content item in home network B 202b, and a conversion is required to render the content item on a rendering device managed by home network A 202a, the transcoder 240 could perform a digital conversion required to render the content item on the rendering device.

The presence tables 242 may contain information regarding media content available in each home network, such as type of media, the titles (e.g. songs, movies, photos, etc.), format, parameters needed for communication, status (e.g. online, busy, waiting for response, etc.), the network's geographic location, or any other characteristic or quality. For example, the status information for devices in the home network can be used to allow remote management. Furthermore, the presence tables 242 may identify the one or more content storing devices which store a particular content item. Thus, the presence tables 242 may be used to process media requests (e.g. for a particular content item in a home network) that do not specify the one or more content storing devices of the home network from which the particular content item is derived. The presence tables 242 may include the presence table 222a and the presence table 222b. The presence tables 242 may include the entire contents of the presence table 222a and the presence table 222b. Alternatively, the presence tables 242 may include references to the presence table 222a and the presence table 222b. The presence tables 242 may have the advantage of aggregating or consolidating information about home network A 202a and home network B 202b (e.g. indexed information described with regard to FIG. 3).

The user interface 244 may include screens and controls that allow the user to interact with the system. For example, the user may employ the system to select media for his or her own use, or to authorize other users to have access to his media. The query engine 246 may be used to query media contents to which the user has access, and online sources for media to use or buy. The policy information 248 may include the list of authorized users who are allowed shared access to content items, and may define how the content items may be used (e.g. predefined hours, access rights to groups of media or selected titles).

Users of the home network community server 204 can serve as system administrators. They can use screens and controls to set up and manage the system 100. In some implementations, the network community server 204 can be hosted by a service provider/telco operator or on any other suitable networks.

Each user profile of the user profiles 250 may include information about the user's media preference, such as favorite artists, authors, albums, or songs. These user profiles 250 may include either authorized personal information for the user, such as background, age, income, marital or other status, interests, hobbies, or any other characteristic. The system may use these profiles 250 in order to recommend additional media that the user may buy for himself or for others.

FIGS. 3a to 3d illustrate a flow chart of a multi-source indexing algorithm that realizes a structured view of content items in a home network, such as home network 102a. The multi-source indexing algorithm may be implemented by the home network manager 206a (or home network manager 206b). However, the multi-source indexing algorithm is not tied to any particular device. Thus, even though the description below refers to steps implemented by the home network manager 206a, the multi-source indexing algorithm can be used in any device or application that requires it. Although the steps below refer to home network 102a and home network A 202a, the steps are equally applicable to home network 102b and home network B 202b.

Figure 3A:
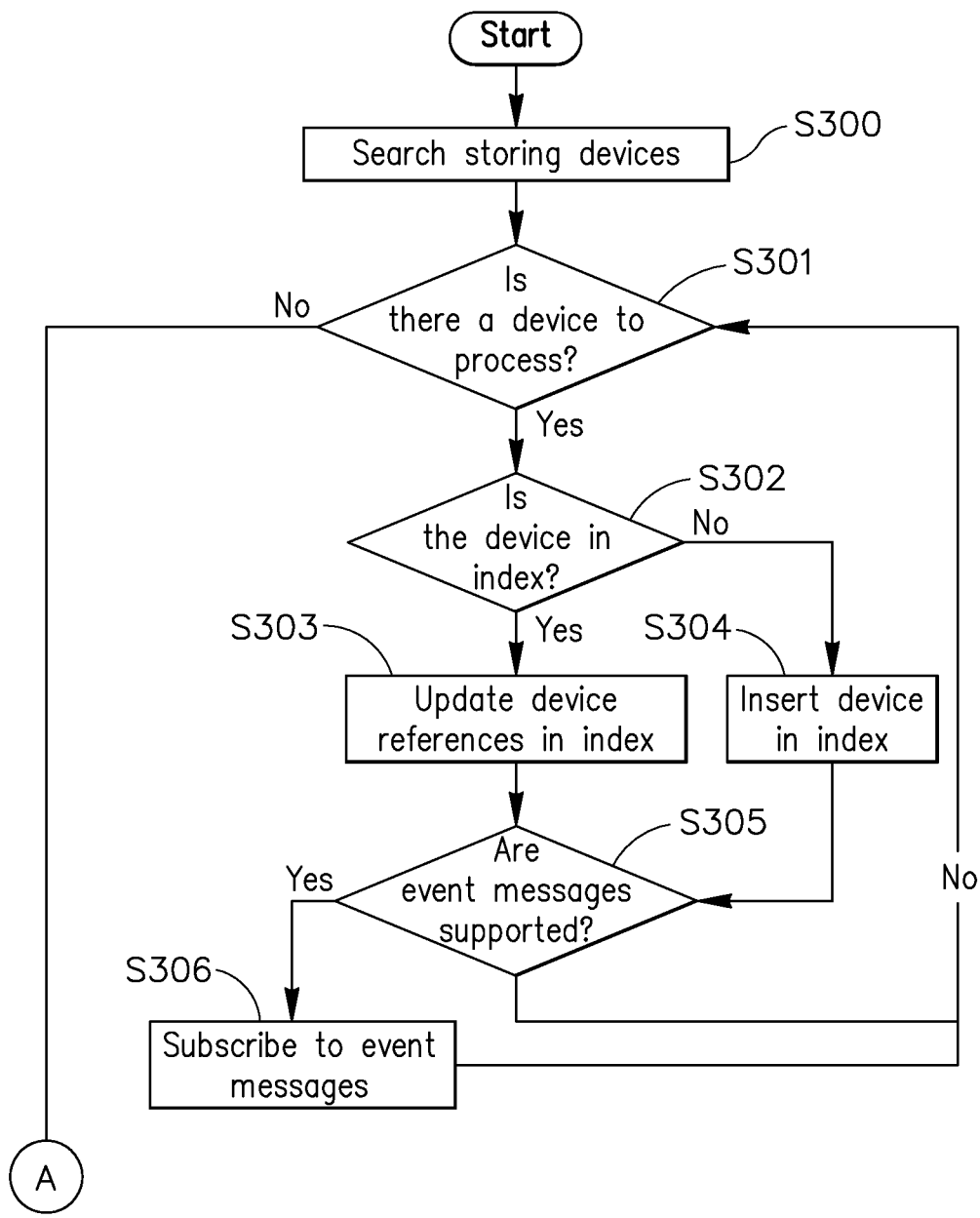
FIGS. 3a to 3d illustrate a flow chart of a multi-source indexing algorithm that realizes a structured view of content items in the home network.

FIG. 3a describes discovery of devices in a home network, e.g. home network 102a, indexing of information about capable devices, and the gathering of device capability information. The function of discovery is to determine the presence of devices in the home network 102a and to begin gathering capability information about the devices in the home network 102a.

At step S300, the home network manager 206a may search for storing devices. Thus, in the example of FIG. 3a, discovery is directed to a search for storing devices. A storing device may be referred to as a content storing device, a media server or a digital media server. Any storing device may also perform other functions such as rendering or sharing content items. The search for storing devices may be implemented by sending a search message from the service discovery module 216a to a multicast address. In some embodiments, the search for storing devices is implemented using the Universal Plug and Play (UPnP) Simple Services Discovery Protocol (SSDP).

For example, for each device in the home network 102a, the service discovery module 216a may determine, possibly based on a response to the search message, whether the device is a content storing device that supports a directory service. If so, the content indexer 220a may extract information from the device to store in the index. The processing of responses to the search message is described below.

The directory service may perform functions such as facilitate a control device, e.g. home network controller 208a, to browse content on a content storing device, and obtain information about objects (e.g. content items or containers) on the content storing device. The directory service may also facilitate home network controller 208a to locate objects that the content storing device is capable of providing. The search message may be designed to discover content storing devices that support the directory service. Multiple content storing devices may respond to the search message.

Each device or content storing device may include an arbitrary number of containers. Some containers may be defined before the performance of step S300. Additional containers may be defined while the steps described in connection with FIGS. 3a to 3d are performed or the steps are completed. The containers may be arbitrarily nested and content items may be arbitrarily organized among them. The arrangement of content items and containers may be understood as analogous to the relationship of files and directories on a PC, where a file corresponds to a content item and a directory corresponds to a container. In some embodiments, the containers are defined according to the ContentDirectory:1 Service Template Version 1.01 for UPnP Version 1.0, dated Jun. 25, 2002 (hereinafter the UPnP ContentDirectory Service).

At step S301 the service discovery module 216a determines whether there is a device to process. For example, it may be that multiple devices respond to the search message, and it is determined that at least some of those devices support the directory service. Response information for the devices supporting the directory service may be stored temporarily and those devices may be processed in steps S302 to S306. After all the devices have been processed, the response information may be deleted from temporary storage.

References to devices supporting the directory service may be stored in an index. The index may be initially created the first time the multi-source indexing algorithm is executed. The index may facilitate the user to access a content item in the home network 102a. In particular, the index may provide quicker and more efficient searches for specific content items. Furthermore, the index may provide the user a single and structured point of access to all content items in home network 102a.

The index may be a subset of the presence table 222a. In some implementations, references to devices supporting the directory service are a subset of the entries in the presence table 222a. Accordingly, the presence table 222a may include information regarding devices that do not support the directory service and devices that do not respond to the search message (e.g. devices that support PTP or a protocol other than UPnP). In other implementations, the index is not a subset of the presence table (e.g. the index is stored as a separate table instead of or in addition to the presence table 222a), and information in the index may be limited to devices that support the UPnP protocol and the directory service. It may be advantageous to limit the data stored in the index in order to reduce storage space and make queries of the index more efficient In some specific cases, the presence table 222a may be a plurality of tables (e.g. one table for each device family). The plurality of tables may be useful when device characteristics (or properties) cannot be efficiently aggregated. Aggregation of device properties across device families (i.e. groups of similar devices) may be difficult if the devices in different families have few common properties. The index may be one of the plurality of tables. In other cases (e.g. when there are few different devices or if the home network manager 202a has a slow or less capable processor) it may be better for the presence table 222a to contain a single table (including the index). Use of the single table may reduce the complexity of queries and result in better performance. Queries involving joins of multiple tables on less capable hardware may perform poorly.

One or more of the following may be stored in the index: a list of devices, device capabilities, pointers to additional information about devices, content items on the devices, containers encapsulating the content items, container tags, container state variables, custom user tags, and/or other information about the device, the containers and the content items on the device.

Assuming there is at least one device to process at step S301, at step S302, the index may be queried to determine whether the device to process is already in the index. Although only a single device is referred to with respect to steps S302 to S347, it should be understood that the following steps can be applied to all devices identified in step S300 that include the directory service.

If the device is already in the index and the home network manager 206a receives an indication that the status of the device has changed, at step S303 references to the device in the index are updated to reflect the current status of the device. The indication that the status of the device has changed may be triggered by a change to one or more of the following device characteristics: an IP address, a mnemonic name, a URL that can be used to retrieve a service description, a URL that can be used to post requests, a URL for subscribing to events, supported services. According to one example, the Service Discovery module 216a receives the indication that the status of the device has changed in a response to the search message.

If the device to process is not already in the index, information about the device is inserted into the index at step S304 by the service discovery module 216a. The information inserted into the index may include the IP address of the device and services supported by the device (e.g. the AVTransport Service, as standardized by the UPnP forum). According to an example, the service discovery module 216a gathers capability information about the device, such as whether the device supports sending event messages or whether the device supports searches for content items that include search criteria. It is possible that different devices support the use of different search criteria. In this case, the capability information may reflect the specific search criteria supported by each device. Capability information may also be understood as services supported by the device or optional features supported by the device.

In some implementations, devices in the home network are implemented according to a standard (e.g. the DLNA Guidelines), and some device capabilities are required by the standard whereas some capabilities are optional. Accordingly, capability information may be understood to refer to optional capabilities defined by the standard or possibly capabilities supported by some devices that are not defined by the standard. Some devices may not support certain capabilities for reasons such as limited processing power or cost/benefit analysis, i.e. the cost of implementing the capability was determined to outweigh the benefits that could be derived from implementing it.

Gathering capability information may be advantageous since it may be possible to perform indexing optimizations based on the capabilities of the device. Optimizations may include limiting index updates to modified containers and searching for content items based on search criteria. A further optimization may be skipping a container whose content items have already been indexed based on a comparison of the container tag with the tag of an already indexed container.

At step S305, a determination is made as to whether the device supports sending event messages. If the device supports sending event messages (also referred to as event notifications), the home network manager 206a sends a subscription message to the device in order to activate an event subscription. Instead of sending a subscription message, the home network manager 206a may determine whether the capability information from the device indicates that the device is capable of sending a container modification event message before sending a subscription message to the device in order to activate an event subscription. It may be that if the device does not support the event subscription, the device will send a response to the home network manager 206a indicating the device does not support the event subscription.

Each event message may identify a change in the state of the device. More specifically, each event message may identify a change to one or more state variables (e.g. the ContainerUpdateIDs variable) on the device. For example, an event message corresponding to the ContainerUpdateIDs variable (i.e. a container modification event message) may indicate a change to one or more containers on the device. By obtaining a notification of when the device changes state and what the change in state comprises, it may be possible to more efficiently index content items on the device. Accordingly, an event message may indicate a changed containers on the device and indexing of content on the device can be restricted to the changed containers.

If a determination is made that the device does not support event messages at step S305, or after subscribing to event messages at S306, the process may return to step S301. If there are additional devices to process, e.g. further devices that responded to the search message and that support the directory service, these additional devices are processed in the manner described above.

Figure 3B:
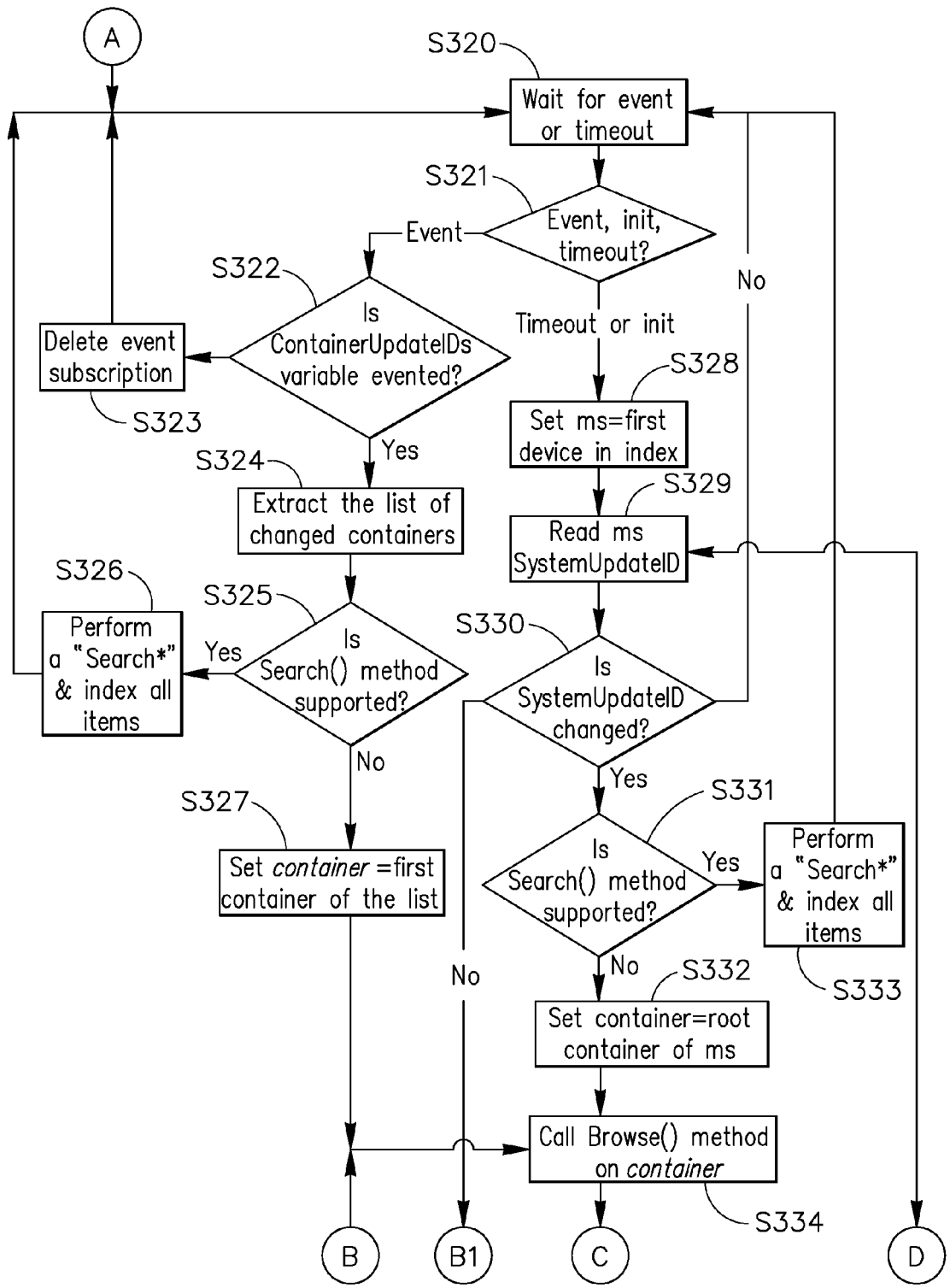

As shown in FIG. 3b, after returning to step S301 and finding no more devices to process, the home network manager 206a may continue to step S320 of FIG. 3b and wait for an event or time out before continuing to index content items. Step S320 may be understood as the beginning of the main indexing cycle, which ends at step S347 of FIG. 3c. One goal of the main indexing cycle is to create one or more data structures to facilitate fast and accurate retrieval of content items. According to one example, building the index comprises inserting entries into the presence table 222a. Indexing of content items may be performed on a device after receiving an event message from the device or, during initialization or after a period of time, for all devices in the index. Indexing of content items may be performed by the content indexer 220a, which may index content items for each device in the index in the order that references to the devices are stored. Indexing of content items may involve processing of content items in each container on the device (in the case of an event message) or devices (in the case of a timeout or initialization).

Optimizations of the indexing process may provide more efficient indexing of content items. In particular, indexing based on receipt of an event message (i.e. a container modification event message) may allow faster indexing of content items since only content items in modified containers are indexed. Moreover, searching for content items based on search criteria may allow faster indexing since only a subset of the content items on the device need to be processed.

The main indexing cycle may be executed when the context indexer 220a is initialized, or to periodically update the index, or when an event notification is received. It may be advantageous to periodically update the index according to a predefined schedule of updates. In the cases of application initialization and periodic indexing the main indexing cycle may be performed against all devices in the index. When an event message is received, it is possible that the main indexing cycle is only performed against the device that sent the event message (the event message may also be referred to as an event notification).

In some embodiments, indexing of content items for all indexed devices is performed upon initialization of the content indexer 220a or after a timeout. Additionally, the event message may be a container modification event message. Upon receipt of the container modification event message, changed containers on the device that sent the event message can be indexed.

For example, a user may add multiple songs from a music CD to the iPod 104d. Accordingly, the iPod 104d may send a container modification event message to the home network manager device 106a. The content indexer 220a may then extract the list of changed containers from the event message. It may be that the content indexer 220a is able to reduce the list of changed containers to one container by eliminating semantically equivalent containers (described in more detail below). Then, content items in the one container may be indexed.

If an event message is received at step S321, a determination is made as to whether a ContainerUpdateIDs variable is "evented" for the device that sent the event message at step S322. The ContainerUpdateIDs variable may be a state variable containing a comma separated list of ordered pairs, where the first element of the pair is a container identifier and the second element is a container version number. The version number may be 0 when the container is created and may increase by one each time an object (e.g. a content item) inside the container changes. In some embodiments, the ContainerUpdateIDs variable is defined according to the UPnP ContentDirectory Service. An evented variable (e.g. the ContainerUpdateIDs variable) is a variable for which the device sends a message (or notification) when a value of the variable changes.

Thus, at step S322, it is determined whether the capability information corresponding to the device indicates that the device is capable of sending a container modification event message. A container modification event message may identify one or more containers on the device that have been changed (e.g. a content item has been added to referenced container). The container modification event message may be understood as an event message comprising a ContainerUpdateIDs variable. In other words, the container modification event message describes container modifications on the device. If the device is not capable of sending a container modification event message, the event subscription is deactivated at step S323. It is possible that the device is not capable of sending the container modification event message because the device only implements mandatory features of the directory service (e.g. to keep costs down). Receiving container modification event messages from devices may allow the content indexer 220a to index more efficiently by only indexing content items in changed containers. Since a purpose of the event subscription is to receive container modification event messages, deactivating the event subscription may prevent the sending of unnecessary event messages.

After step S323 the home network manager 206a may return to step S320. If the ContainerUpdateIDs variable is evented (i.e. the device sends a container modification event message when a container on the device changes), a list of changed containers may be extracted from the device at step S324. Extracting the list of changed containers may involve receiving a container modification event message and extracting the list of changed containers from the received event message. The list of changed containers (i.e. the extracted list) may correspond to the ContainerUpdateIDs variable as described above. A content item is an example of an object. Obtaining the ContainerUpdateIDs variable may have the advantage of speeding up the indexing of content items. In other words, by subscribing to event messages from a device when the capability information for the device indicates that the device is capable of sending container modification event messages, it may be possible to index content items on the device more quickly. This is because indexing of content items can be restricted to containers that have changed and containers that have not changed can be skipped.

At step S325 a determination is made regarding whether the device capability information indicates that the device being processed is capable of responding to a search based on search criteria (i.e. the search method). In some embodiments, the search method may be performed using a search function defined by the UPnP ContentDirectory Service. If the device is capable of supporting the search method, the search method is performed at step S326 and the results of the search may be indexed based on any changes to content items determined by the search. In one example, the search is performed by the Content Indexer 220a and the results are stored in the presence table 222a. The search and index step S326 may be performed according to the following rules:

if a content item is not present in the index, the content item is added along with metadata related to the content item;
    if the content item has changed since the content item was last indexed, the corresponding index reference is changed accordingly;

if the content item is referred to in the index, but the content item is no longer present on the device, the content item is deleted from the index.

In addition to performing the search and index step S326 according to the rules above, the search may also be performed incrementally. In other words, the search may be restricted to only a subset of the content items on a device, i.e. the search may be designed to exclude content items already indexed. Thus, if the index of content items refers to content items on the device, the search criteria may be based on the content items of the device that have already been indexed. In other words, in order to reduce execution time, the search of content items may be restricted, as far as possible, to content items that have not been indexed Reducing the execution time of the search and index step may be possible because of a number of optimizations. For example, if the container modification event message indicates that containers with the identifiers 3, 15 and 18 have changed, the search could be restricted to containers 3, 5, and 18. In contrast to browsing, a search based on search criteria may exclude nested containers. Thus, according to an example, there are 5 content items and 10 nested containers in container 3. Browsing container 3 according to the browse method described above would return a list of 15 objects (i.e. 5 content items and 10 containers). Performing a search with search criteria, it is possible to exclude the nested containers and limit the search to the 5 content items.

In addition or alternatively, if the device supports search criteria such as a boolean flag indicating whether content items have changed or not, the search and index step S326 could be restricted to changed content items. Based on the gathered capability information, it is possible to determine whether the device supports search criteria restricting the search of content items to modified containers and/or the boolean flag, and perform the content item search in an efficient manner.

It may be possible to perform additional or alternative optimizations of the search criteria based on supported search criteria identified by the gathered capability information.

If the device is not capable of supporting the search method (i.e. the search based on search criteria), at step S327 a container variable is set by the content indexer 220a, to indicate that indexing of content items on the device will begin with the first changed container in the extracted list. If there are other changed containers, indexing of content items on the device may continue with the other changed containers from the extracted list as described below with reference to step S345.

Storing a container version number in the index, along with a reference to the corresponding container, may have the advantage of facilitating index updates that are restricted to containers that have been changed. The container version number in the index may be updated when the container version number on the device changes. The version number of the container may indicate the update status of the container. Thus, the version number of the container may be used to determine whether the indexed container items correspond to container items on the device.

Returning to step S321, a determination may be made to index the content items of all devices referred to in the index. This determination may be made after a timeout, i.e. after a preset period of time has elapsed, or when the content indexer 220a on the home network manager 206a is initialized (init). Accordingly, at step S328, updating the index of content items may begin with the first device referred to in the index, i.e. the device to be indexed. At step S329, a system variable is obtained from the device to be indexed which indicates whether at least one of the containers on a device has changed. Each container on the device may have a unique identifier, and may contain a collection (or plurality) of content items, as well as other containers.

A SystemUpdateID variable may be a state variable on the device that is updated whenever anything in the directory on the device changes. In some embodiments, the SystemUpdateID variable is defined according to the UPnP Content Directory Service.

Figure 3C:
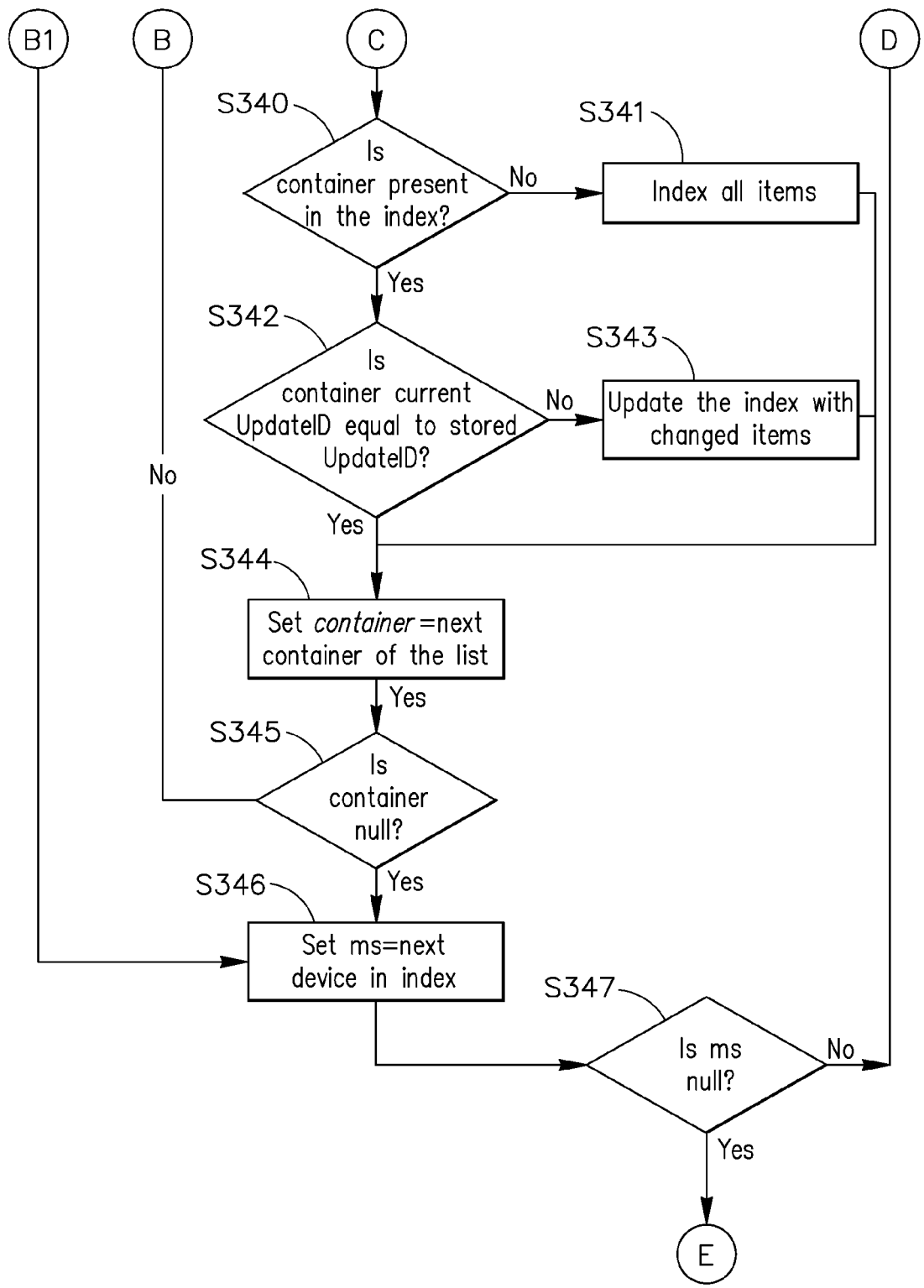

At step S330 the SystemUpdateID variable from the device is compared with a SystemUpdateID value stored in the index and corresponding to the device. If the SystemUpdateID variable from the device is different from the stored SystemUpdateID value, i.e. at least one container on the device has been modified since the index was last updated, the index references corresponding to the device are updated. In other words, the containers, content items, state variables (e.g. the SystemUpdateID variable) and other relevant device information is re-indexed. If the System UpdateID variable has not changed since the index was last updated or if there is no SystemUpdateID variable in the index corresponding to the device, then nothing on the device has changed and the next device may be indexed in step S346, as shown in FIG. 3c.

However, if the SystemUpdateID variable has changed, at step S331 a determination is made regarding whether the device capability information indicates that the device being processed is capable of responding to a search based on search criteria. The device capability information may be retrieved by the service discovery module 216a during step S300 or via a subsequent query. The search based on search criteria may be performed using a search function defined by the UPnP Content Directory Service. If the device is capable of supporting the search based on search criteria, the search based on search criteria is performed at step S333. The search and index step S333 may be performed according to the following rules:

if a content item is not present in the index, the content item is added along with metadata related to the content item;

if the content item has changed since the content item was last indexed, the corresponding index reference is changed accordingly;

if the content item is referred to in the index, but the content item is no longer present on the device, the content item is deleted from the index.

In addition to performing the search and index step S333 according to the rules above, the search may also be performed incrementally. In other words, the search may be restricted to only a subset of the content items on a device, i.e. the search may be designed to exclude content items already indexed. Thus, if the index of content items in the index refers to content items on the device, the search criteria may be based on the content items of the device that have already been indexed. In other words, in order to reduce execution time, the search of content items may be restricted, as far as possible, to content items that have not been indexed. For example, the search and index step S333 may be restricted by using a boolean flag as search criteria to restrict the search index step to changed content items on the device (i.e. search for all content items where "changed=true"). Steps S331 and S333 may be performed in a similar manner as steps S325 and S326. However, in contrast to step S326, it may not be possible to restrict the search to changed containers in step S333, since the search and index step S333 was not triggered by a container modification event message.

It may be that a content item search using search criteria is not supported by the device being processed. If this is the case, the containers on the device may be navigated, starting from a root container, as in step S332. The root container may be a container with an ID of 0 and a parent ID of −1. In some embodiments, the root container may be defined according to the UPnP Content Directory Service.

Following step S332, at step S334 the content items of each container on the device are navigated and indexed. Step S334 may also be reached from step S327 or step S345. Thus, step S334 may be reached in following an event message, in which case browsing begins with the first container of the extracted list, and continues through the rest of the containers in the extracted list. Step S334 may also be reached after timeout or initialization, in which case browsing begins from the root container, and continues through all the containers on the device.

It may be that browsing and indexing is performed recursively for any nested container. A nested container may be understood as a container enclosed within, or referred to by, another container. If a directory service is implemented on the device, particularly the UPnP Content Directory Service, browsing and indexing of content items is supported. Browsing of content items may be performed using a browse function defined by the UPnP Content Directory Service. When the content items of a container are browsed, the response may be analyzed and the index may be updated in accordance with the steps S340 to S343, described with reference to FIG. 3c.

Browsing may be understood as incrementally navigating the objects in the directory. For example, browsing a container may involve enumerating (i.e. listing) each and every content item in the container. In contrast, searching may involve enumerating a subset of the content items in the container, based on search criteria. Searching and browsing may be performed using function supported by the directory on the device. Not all devices may support searching, possibly due to cost of implementation. Searching or browsing may be performed in order to index content items. Searching may be more efficient than browsing, since search criteria may be used to restrict or limit the content items processed.

Turning to FIG. 3c, steps S340 to S347 describe the process of indexing content items in the container being processed, determining whether there is another container to process and determining whether there is another device to process. Steps S334 to S345 may be performed iteratively for each changed container if the ContainerUpdateIDs variable is evented, or for all containers if the ContainerUpdateIDs variable is not evented.

At step S340 a query may be performed to determine whether the container is present in the index. Step S340 may be reached after step S334. At step S341, if the container is not present in the index, the container may be added to the index, along with an identifier of the container, a version of the container and the metadata of the container. Metadata of the container may include tags defining the type or content of the container. Once the container is added to the index, the container is considered to be changed (i.e. modified). If a change to the container is detected, indexing (or re-indexing) of content items within the container is performed. In other words, once a changed container has been detected, the references in the index corresponding to the container are updated. This may include updating the version number of the container in the index.

At step S342, a determination is made as to whether the container is present in the index. If the container is present in the index, the version of the container currently on the device is compared with the version of the container stored in the index. If the versions differ, at step S343 the index is updated to reflect the version of the container on the device, and the index is updated to reflect the items in the container that have been changed. If the container is present in the index, and the version of the container on the device matches the version of the container in the index, it is not necessary to index the items in the container. If the container is present in the index and the container is no longer present on the device being processed, the container is deleted from the index. Indexing of each item is performed as described above with respect to the rules for searching.

At step S344, the next container in the list of containers is retrieved. If steps S340 to S343 were performed in response to a container modified event message, i.e. the ContainerUpdateIDs variable is evented for the device, the list of containers is the extracted list referred to above. However, if steps S340 to S343 were performed following step S332, i.e. after a timeout or as part of the initialization process, the list of containers corresponds to all containers on the device. Step S345 shows that processing continues until all containers in a list of containers are processed. For example, as shown in FIG. 3c, if step S345 indicates that another container remains in the list of containers, the process returns to step S334, which invokes the browse method for the next container in the list. It may be that nothing can be inferred about containers nested within the container being processed, since the version of the container being processed may not reflect changes to its nested containers. Thus, nested containers within a parent container may need to be recursively processed.

In some cases, each container may have associated tags. Some container tags may be determined by the directory, other tags may be user defined. Tags may provide semantic information about a container. For example, one tag may define the type of a container, and another tag may define the content of a container. Furthermore, it may be possible to perform a comparison of a tag of one container with a tag of another container. In addition, it may be possible to skip the indexing of a container if a tag of the container defines the same content as a tag of a container that has already been indexed. According to a specific example, a container named Albums has just been indexed. The Albums container has a upnp:searchclass tag with the value object.container.album.musicAlbum, meaning that the albums container contains a list of music albums and songs. The next container, named Artists, has a value of object.container.person.musicArtist for the upnp:searchclass tag, meaning that the content is a list of music artists and songs. It can be deduced (e.g. by the content indexer 220a) that the content items in the container named Artists are the same as the content items in the container named Albums. Therefore, it is not necessary to index the container named Artists. Accordingly, the Albums container and the Artists container may be understood as different views of the same items, such that if one of them has already been indexed, the other container can be skipped. Similar comparisons can be made with other tags. Thus, comparing the tags of different containers may facilitate optimization of the indexing process.

At step S346, an attempt is made to process the next device. If step S346 is performed after a container modification event message is received, the next device may be null. However, if step S346 is performed after an initialization (init) or timeout, and there is another device to process (i.e. a device discovered in step S300 that supports the directory service), the home network manager 206a may return to step S329 of FIG. 3b to index the device. Otherwise, if there are no more devices to process, step S360 of FIG. 3d may be performed.

Figure 3D:
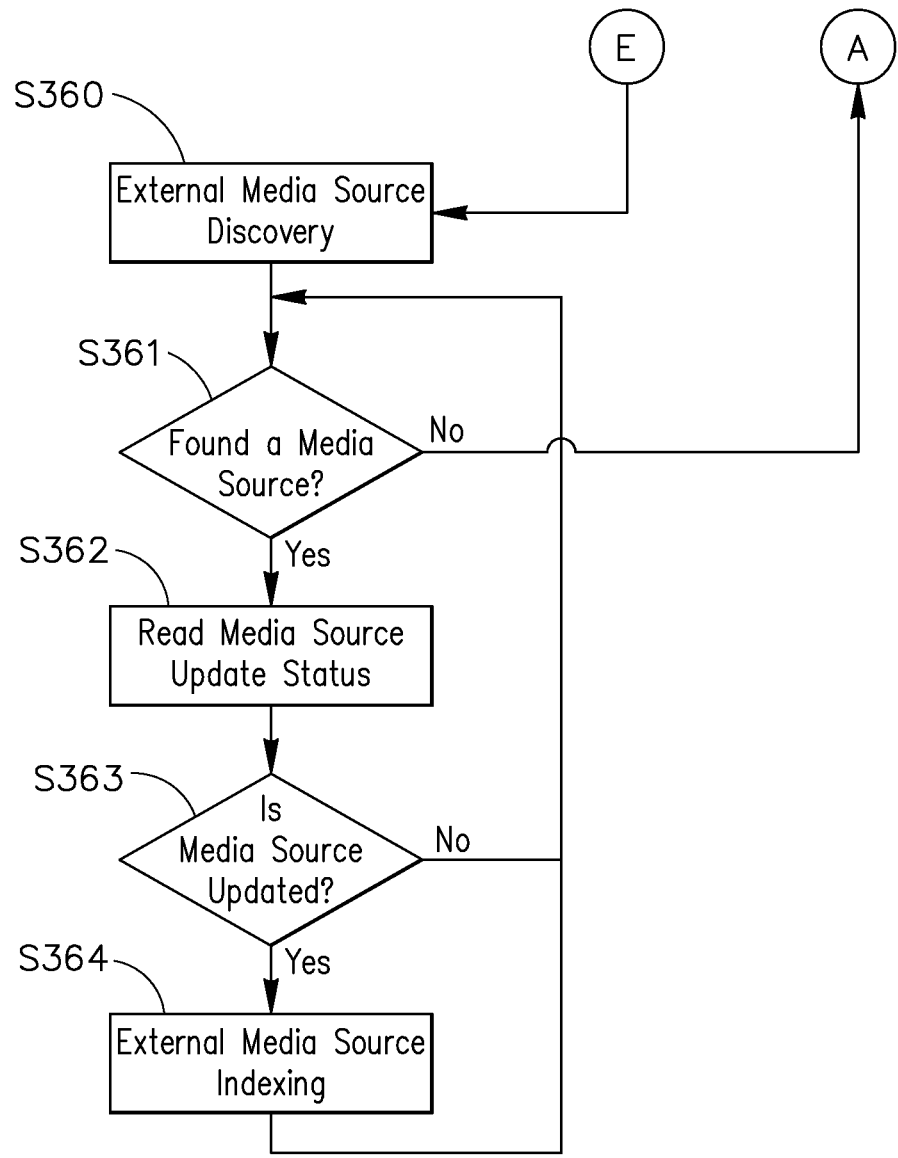

FIG. 3d shows steps that may be performed to index content from external sources. An external source may be understood as a source that does not support the directory service.

In step S360, a search for external sources may be performed, possibly similar to the search described at step S300. Step S360 may be performed after step S347. If an external media source or media source is found at step S361, the update status of the media source may be read at step S362. For example, if the media source is a device that supports PTP, then information may be read from the device using PTP. If step S363 determines that the media source has been changed (e.g. a new picture has been added since the media source was last indexed), the external media source may be indexed at step S364. The process may return to step S361 to index the next external media source. If there are no more external media sources, i.e. the answer at step S361 is no, the home network manager 206a may return to step S320 and wait for indexing to begin again.

Advantageously, a user may apply custom tags to indexed content items. Custom tags may be applied using the home network controller 208a (or the home network controller 208b). Examples of custom tags are the lyrics for songs, the names and positions of people in a picture, and a scene description for a video.

The index may contain the following information:
- a list of content storing devices, pointers to detailed information about the content storing devices and capability information of the content storing devices;
- a list of containers for each content storing device, a system update identifier (SystemUpdateID) for each device, an update identifier (UpdateID) for each container, and container metadata (e.g. the container name, the upnp:class, the upnp:searchclass, etc.);
- a list of content items for each container including content item metadata (e.g. the name, the title, the author, the upnp:class, etc.), as well as user added custom tags.

In addition to facilitating user access to a content item in the home network, the multi-source indexing algorithm described above may facilitate a media server (i.e. a content storing device) to expose its own content together with the content of other media servers in the home network. This advanced media server may use multi-source indexing to create an index of all content items in the home network (that is content stored in all content storing devices in the home, including the media server itself), facilitating the user to search and play media content from any device, browsing only the advanced media server.

A network manager device that performs, according to the multi-source indexing method described above, indexing of all content items in the home network, allows the user to focus only on the media he desires to play, and not its location. The control point, e.g. the home network manager 206a, may also be used to control rendering devices in the home and through capability matching, avoid compatibility issues.

FIG. 4 is a swim-lane diagram showing an example sequence of actions 400 for in-home access and playback control. The actions 400 occur among a home network 402 and an online content server 404. For example, the home network 402 may be any of the home networks 102a or 102b described with respect to FIG. 1. The home network 402 may include an in-home media source 406 (e.g., a movie player), an in-home media player 408, a home network controller 410, and a home network manager 412. These components of the home network 402 may be similar to the components of other home networks described above.

Processing may start when the home network manager 412 performs discovery 414 and 416 to determine available media storage devices (e.g. in-home media source 406) and rendering devices (e.g. in-home media player 408), respectively, within the home network 402. In response, notifications 418 and 420 may be provided to the home network manager 412. The notifications may provide capability information regarding in-home media source 406 and in-home media player 408. The capability information may be stored in the index, where the index may be a subset of the presence table 222a.

In order to prepare for content searches that a user may perform for selected media content (e.g. based on specific titles, etc.), the system may scan (or discover) devices within the home network 402. The in-home media source 406 and the in-home media player 408 may be discovered. The home network manager 412 may issue one or more content browsing requests 422. The content browsing request 422 may be performed in the same manner as the browse method described in connection with FIG. 3b. The content browsing request 422 may be used to determine the content items (e.g. digital music or movies) on the in-home media source 406. In response, the in-home media source 406 may provide a response 424 that includes a list of content items on the in-home media source 406. The home network manager 412 may perform indexing 426 based on the content response, so as to facilitate more efficient identification and searching of media content in the future. Indexing 426 may be performed using the multi-source indexing algorithm described above. Indexing 426 may facilitate fast and efficient access to content items in the home network 402.

When the user is ready to select media content (e.g. identify a movie to watch), the home network controller 410 may issue a content search 428, such as based on user selections in a user interface. The home network manager 412 may perform a local database search 430. The home network manager 412 may also perform a content search 432 on the online content server 404, and in response, receive a list of matching content 434. The home network manager 412 may mix the local and online search results 436, and provide the search results 438 to the home network controller 410.

The user may choose the media and media player 440 and issue a playback request 442.

Figure 5:
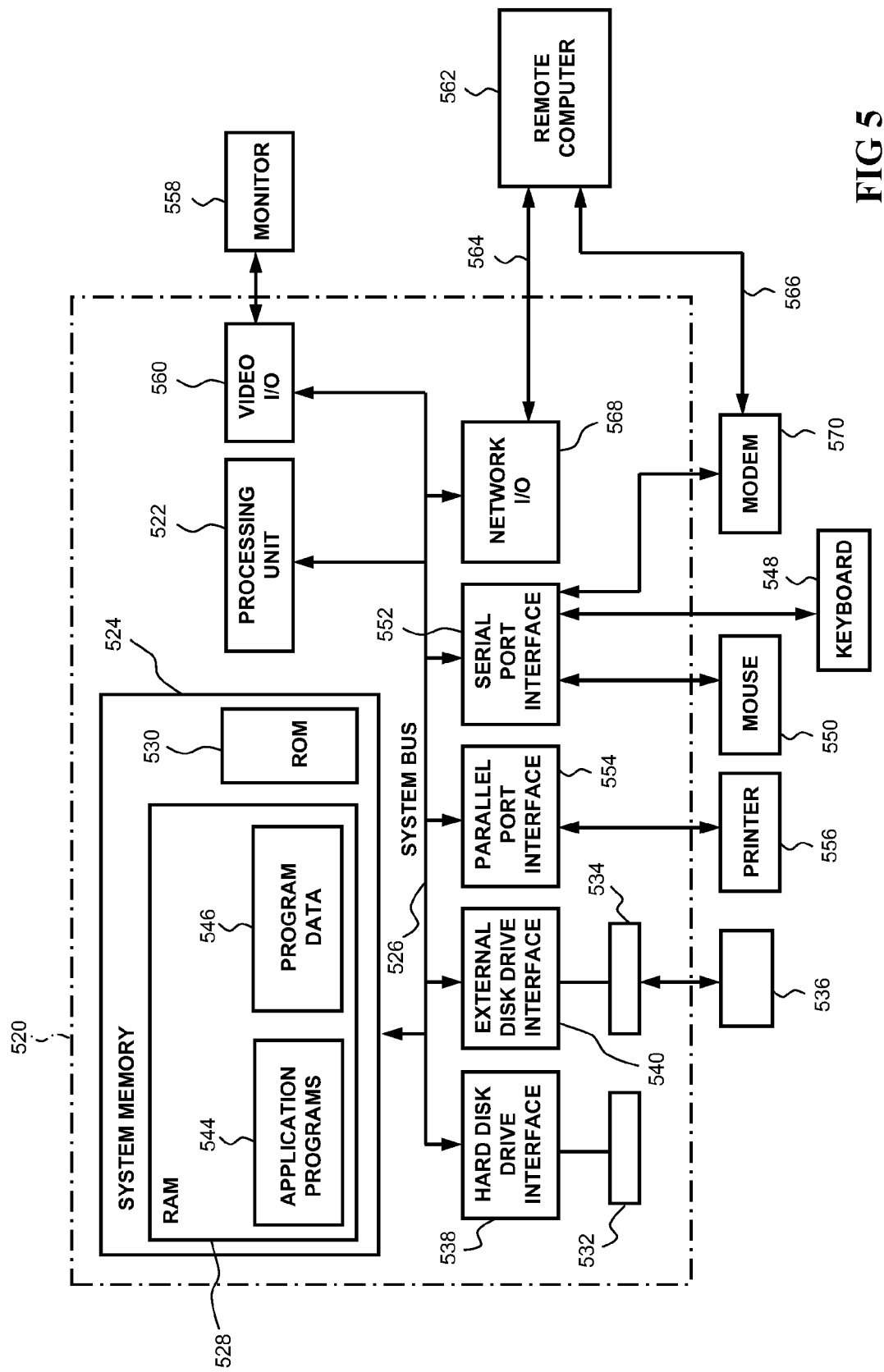
FIG. 5 shows an exemplary system for implementing aspects of the invention.

FIG. 5 shows an exemplary system for implementing aspects of the invention including a general purpose computing device in the form of a conventional computing environment 520 (e.g. a personal computer). The conventional computing environment includes a processing unit 522, a system memory 524, and a system bus 526. The system bus couples various system components including the system memory 524 to the processing unit 522. The processing unit 522 may perform arithmetic, logic and/or control operations by accessing the system memory 524. The system memory 524 may store information and/or instructions for use in combination with the processing unit 522. The system memory 524 may include volatile and non-volatile memory, such as a random access memory (RAM) 528 and a read only memory (ROM) 530. A basic input/output system (BIOS) containing the basic routines that helps to transfer information between elements within the personal computer 520, such as during start-up, may be stored in the ROM 530. The system bus 526 may be any of several types of bus structures including a memory bus or memory controller, a peripheral bus, and a local bus using any of a variety of bus architectures.

The personal computer 520 may further include a hard disk drive 532 for reading from and writing to a hard disk (not shown), and an external disk drive 534 for reading from or writing to a removable disk 536. The removable disk may be a magnetic disk for a magnetic disk driver or an optical disk such as a CD ROM for an optical disk drive. The hard disk drive 532 and the external disk drive 534 are connected to the system bus 526 by a hard disk drive interface 538 and an external disk drive interface 540, respectively. The drives and their associated computer-readable media provide nonvolatile storage of computer readable instructions, data structures, program modules and other data for the personal computer 520. The data structures may include relevant data for the implementation of the method for facilitating a user to access a content item in a network, as described above. The relevant data may be organized in a database, for example a relational or object database.

Although the exemplary environment described herein employs a hard disk (not shown) and an external disk 536, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 536, ROM 530 or RAM 528, including an operating system (not shown), one or more application programs 544, other program modules (not shown), and program data 546. The application programs may include at least a part of the functionality as depicted in FIGS. 1 to 5.

A user may enter commands and information, as discussed below, into the personal computer 520 through input devices such as keyboard 548 and mouse 550. Other input devices (not shown) may include a microphone (or other sensors), joystick, game pad, scanner, or the like. These and other input devices may be connected to the processing unit 522 through a serial port interface 552 that is coupled to the system bus 526, or may be collected by other interfaces, such as a parallel port interface 554, game port or a universal serial bus (USB). Further, information may be printed using printer 556. The printer 556, and other parallel input/output devices may be connected to the processing unit 522 through parallel port interface 554. A monitor 558 or other type of display device is also connected to the system bus 526 via an interface, such as a video input/output 560. In addition to the monitor, computing environment 520 may include other peripheral output devices (not shown), such as speakers or other audible output.

The computing environment 520 may communicate with other electronic devices such as a computer, telephone (wired or wireless), personal digital assistant, television, or the like. To communicate, the computer environment 520 may operate in a networked environment using connections to one or more electronic devices. FIG. 5 depicts the computer environment networked with remote computer 562. The remote computer 562 may be another computing environment such as a server, a router, a network PC, a peer device or other common network node, and may include many or all of the elements described above relative to the computing environment 520. The logical connections depicted in FIG. 5 include a local area network (LAN) 564 and a wide area network (WAN) 566. Such networking environments are commonplace in offices, enterprise-wide computer networks, intranets and the Internet and may particularly be encrypted.

When used in a LAN networking environment, the computing environment 520 may be connected to the LAN 564 through a network I/O 568. When used in a WAN networking environment, the computing environment 520 may include a modem 570 or other means for establishing communications over the WAN 566. The modem 570, which may be internal or external to computing environment 520, is connected to the system bus 526 via the serial port interface 552. In a networked environment, program modules depicted relative to the computing environment 520, or portions thereof, may be stored in a remote memory storage device resident on or accessible to remote computer 562. Furthermore, other data relevant to facilitating a user to access a content item in a network (described above) may be resident on or accessible via the remote computer 562. It will be appreciated that the network connections shown are exemplary and other means of establishing a communications link between the electronic devices may be used.

The above-described computing system is only one example of the type of computing system that may be used to implement the method for facilitating a user to access a content item in a network.

We claim:

1. A computer-implemented method for providing access to a content item in a network, the method, comprising:
    gathering capability information from a device in the network, wherein the device includes a directory of a plurality of content items, wherein the directory includes a first container and a second container, wherein at least one of the plurality of content items is organized in the first container, and wherein at least another of the plurality of content items is organized in the second container;
    sending a subscription message to the device in order to activate an event subscription, when the capability information indicates that the device is capable of sending an event message notifying a change in a state of the device;
    providing an index referring to the plurality of content items stored in the first container and the second container;
    determining whether the directory has been modified;
    determining whether the capability information further indicates that the device is capable of responding to a search based on at least one search criterion;
    when determining that the directory has been modified and the capability information indicates that the device is capable of responding to the search, performing a content item search using the at least one search criterion, wherein the at least one search criterion is based on the index of the plurality of content items; and
    updating the index based on results of the content item search; and
    wherein when the container modification event message further indicates that the second container has been modified and that the first container has not been modified, restricting the content item search to be within the second container.

2. The method of claim 1, further comprising
    sending the subscription message to the device in order to activate the event subscription, when the capability information indicates that the device is capable of sending the container modification event message.

3. The method of claim 2, further comprising
    deactivating the event subscription, when the capacity information indicates that the device is not capable of sending the container modification event message.

4. The method of claim 2, wherein when the capability information indicates that the device is not capable of sending the container modification event message:
    determining whether the directory has been modified by polling the device.

5. The method of claim 1, wherein providing the index further comprises:
    determining that the device supports a directory service; and
    wherein the index does not refer to content items located on other devices that do not support the directory service.

6. The method of claim 1, wherein each of the first and second containers referenced in the index has a corresponding version number.

7. The method of claim 1, wherein the index refers to the device and the capability information of the device.

8. The method of claim 1, wherein either or both of at least one indexed container and at least one indexed content item has an associated tag in the index.

9. The method of claim 1, wherein providing the index comprises sending a search message to a multicast address, and when a responding device provides an indication that the responding device supports a directory service:
   adding references to content items on the responding device to the index.

10. The method of claim 1, further comprising:
    adding a third container to the device, wherein the third container organizes multiple content items;
    associating a first tag with the first container, a second tag with the second container and a third tag with the third container, wherein each tag defines the content items organized by a corresponding associated container;
    performing a comparison of the third tag with the first tag and a further comparison of the third tag with the second tag;
    updating the index to include the third container and the multiple content items organized by the third container, when the third tag does not define same content items as the second tag and the third tag does not define same content items as the first tag.

11. A computer program product including a non-transitory machine readable storage medium and
    computer-readable instructions stored on the non-transitory machine readable storage medium, the computer-readable instructions executable on a computer system, cause the computer system to implement a method comprising:
    gathering capability information from a device in the network, wherein the device includes a directory of a plurality of content items, wherein the directory includes a first container and a second container, wherein at least one of the plurality of content items is organized in the first container, and wherein at least another of the plurality of content items is organized in the second container;
    sending a subscription message to the device in order to activate an event subscription, when the capability information indicates that the device is capable of sending an event message notifying a change in a state of the device; and
    deactivating the event subscription when the capability further indicates that the device is not capable of sending a container modification event message notifying any modifications done to any of the containers within the directory;
    providing an index referring to the plurality of content items stored in the first container and the second container;
    determining whether the directory has been modified;
    determining whether the capability information further indicates that the device is capable of responding to a search based on at least one search criterion;
    when determining that the directory has been modified and the capability information indicates that the device is capable of responding to the search, performing a content item search using the at least one search criterion, wherein the at least one search criterion is based on the index of the plurality of content items; and
    updating the index based on results of the content item search;
    wherein when the container modification event message further indicates that the second container has been modified and that the first container has not been modified, restricting the content item search to be within the second container.

12. The computer program product of claim 11, where the method further comprises:
    sending the subscription message to the device in order to activate the event subscription, when the capability information indicates that the device is capable of sending the container modification event message.

13. The computer program product of claim 11, wherein when the capability information indicates that the device is not capable of sending the container modification event message:
    determining whether the directory has been modified by polling the device.

14. The computer program product of claim 11, wherein providing the index comprises sending a search message to a multicast address, and when a responding device provides an indication that the responding device supports a directory service:
    adding references to content items on the responding device to the index.

15. A computer system for accessing a content item in a network, the system comprising:
    a content storing device comprising a memory storing:
        a directory of a plurality of content items, wherein the directory includes a first container and a second container, wherein at least one of the plurality of content items is organized in the first container, and wherein at least another of the plurality of content items is organized in the second container;
    a network manager device comprising a computer processor operable to:
        gather capability information from the content storing device;
        send a subscription message to the content storing device in order to activate an event subscription, when the capability information indicates that the content storing device is capable of sending an event message notifying a change in a state of the content storing device; and
        deactivate the event subscription when the capability further indicates that the content storing device is not capable of sending a container modification event message notifying any modifications done to any of the containers within the directory;
        provide an index referring to the plurality of content items stored in the first container and the second container;
        determine whether the directory has been modified;
        determine whether the capability information further indicates that the content storing device is capable of responding to a search based on at least one search criterion;
        when determining that the directory has been modified and the capability information indicates that the content storing device is capable of responding to the search, perform a content item search using the at least one search criterion, wherein the at least one search criterion is based on the index of the plurality of content items; and
        update the index based on results of the content item search;

wherein the network connects the network manager device to the content storing device and when the container modification event message further indicates that the second container has been modified and that the first container has not been modified, the network manager is further operable to restrict the content item search to be within the second container.

16. The system of claim 15, wherein the computer processor of the network manager device is further operable to:
send the subscription message to the content storing device in order to activate the event subscription, when the capability information indicates that the content storing device is capable of sending the container modification event message.

17. The system of claim 15, where the computer processor of the network manager device is further operable, when the capability information indicates that the content storing device is not capable of sending a container modification event message, to:
determine whether the directory has been modified by polling the device.

18. The system of claim 15, where the computer processor of the network manager device is further operable to provide the index by sending a search message to a multicast address, and is further operable to add references to content items on a responding device to the index, when the responding device provides an indication that the responding device supports a directory service.

* * * * *